United States Patent [19]
Kawamura

[11] Patent Number: 4,576,444
[45] Date of Patent: Mar. 18, 1986

[54] MACRO-FOCUS ZOOM LENS
[75] Inventor: Atsushi Kawamura, Yokosuka, Japan
[73] Assignee: Ricoh Company, Ltd., Tokyo, Japan
[21] Appl. No.: 609,357
[22] Filed: May 11, 1984
[30] Foreign Application Priority Data
 May 12, 1983 [JP] Japan .................................. 58-81727
[51] Int. Cl.⁴ .......................... G02B 9/36; G02B 15/22
[52] U.S. Cl. ............................................................ 350/428
[58] Field of Search ........................................... 350/428
[56] References Cited
U.S. PATENT DOCUMENTS
 3,912,376 10/1975 Ogura et al. ......................... 350/428

Primary Examiner—John K. Corbin
Assistant Examiner—Rebecca D. Gass
Attorney, Agent, or Firm—Oblon, Fisher, Spivak, McClelland & Maier

[57] ABSTRACT

This invention relates to a macro-focus zoom lens in which five lens groups of a refractive power arrangement of negative, positive, negative, positive and positive are allowed to have a macro-focusing function. As zooming performs from a tele to a wide angle, a second lens group and a fourth lens group is moved as a variator towards an image, a first lens group is moved as a compensater, and a third lens group and a fifth lens group are fixed. When the second group and fourth group are moved from the wide angle end to the object side, macro-focusing becomes possible to make. This involves less variation in aberration as compared with macro-focusing by other methods and a lens mount is also simple in construction.

2 Claims, 6 Drawing Figures

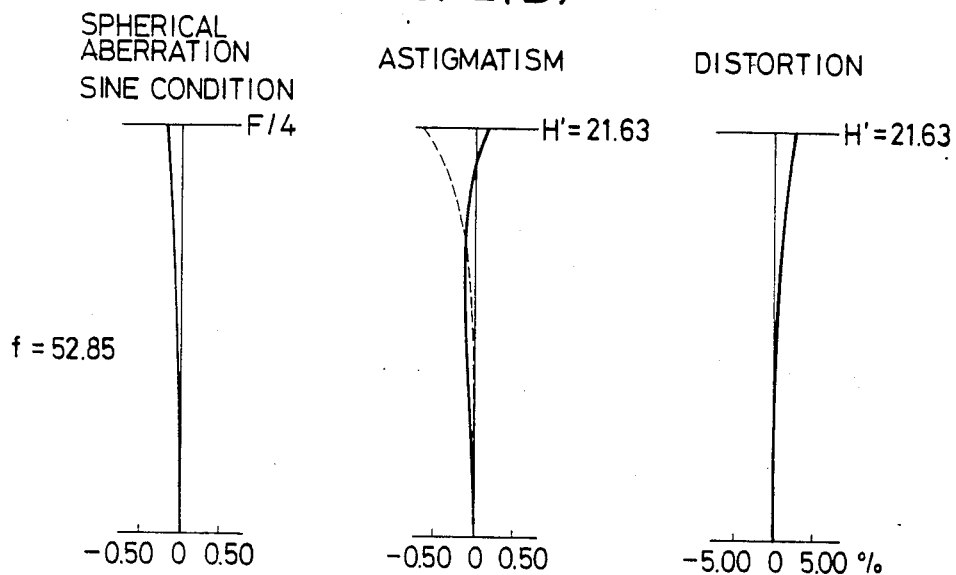
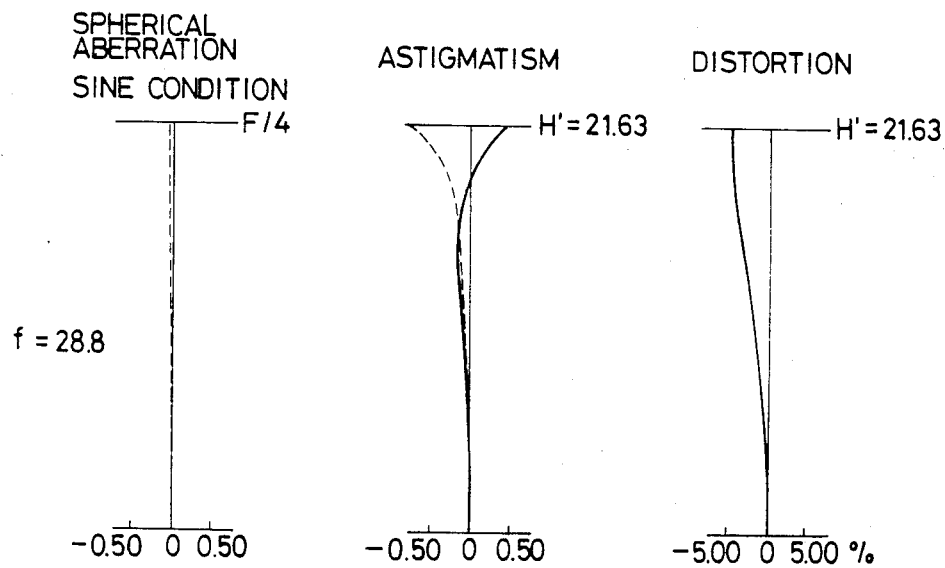

MACRO-FOCUS ZOOM LENS

BACKGROUND OF THE INVENTION

1. Field of the Invention

This invention relates to a zoom lens used as a photographic lens for a 35 mm camera, TV and VTR cameras and the like, and particularly, to a zoom lens consisting of five groups and having a macro-photographic mechanism.

2. Description of the Prior Art

Recently it has a tendency that zoom lenses are widely used as photographic lenses for a 35 mm camera, and TV and VTR cameras, Actually, however, the zoom lens involves (1) Lowering of brightness of the edge of the image field at the wide angle end arises.

(2) A break of aberration, particularly spherical aberration at the tele end is large and therefore, it would be best if photographing up to about 10 times of focal length $f_{tel}$ at the telephoto end could be made.

However, it is sometimes impossible to sufficiently take the distance from the object to the camera depending on the photographing condition, and one often wishes to take a picture of a small object into a large size without using other accessories. Particularly, in the high magnification zoom, if the shortest photographing distance is $10 \times f_{tel}$, it is extremely inconvenient, resulting in a narrow range of photographing.

Therefore, it has been recently desired that a macro-photographing mechanism is incorporated into a zoom lens.

SUMMARY OF THE INVENTION

This invention provides a macro-photographing mechanism which involves no disadvantage noted above in a zoom lens consisting of five groups in which magnification changing ratio is approximately 3.3 and F No. is approximately 4. The invention further provides a macro-photographing mechanism wherein macro-photographing is effected from the wide angle end to less deteriorate aberrations and not to impair compactness of the lens.

A zoom lens having a macro-photographing mechanism incorporated therein in accordance with the present invention comprises five lens groups of negative, positive, negative, positive and positive in order from the object side, wherein when zooming is performed from a telephoto side to a wide angle side, the second and fourth groups are moved as a variator towards an image, the first group is moved as a compensater, and the third and fifth groups are fixed.

In the zoom lens constructed as described above, in performing the macro-photographing, the following system is taken into consideration:

(1) The second group is independently moved towards the object, (2) the second and fourth groups are moved towards the object at a suitable ratio, and (3) the second and fourth groups are moved towards the object at substantially the same ratio as that of zoom range. In addition to above, there is a method that the third group or the fifth group is moved. However, it would not be advisable to move the lens groups, which are fixed when zooming is performed, only for the purpose of macro-photographing because the lens mount becomes complicated.

As the result of studies of focusing characteristics, it has been found that the above-described system (3) is particularly excellent. That is, FIG. 1 is a sectional view of a zoom lens shown as an embodiment and a locus of movement thereof. As will be apparent from the locus, in the above-described system (3), the arrangement of the lens groups except the first group is same in state as somewhere in the zoom range, which corresponds to the state wherein only the first group is delivered. For example, in the focusing state with respect to the macro-focus range, that is, with respect to close quarters, it will be substantially the same state wherein the first group is delivered through a under the state of $f=b$.

At this time, there produces the effects:

(1) At the wide angle side, there occurs less variation in aberration due to the delivery of the first group, and (2) Lowering of brightness of the edge of the image field is compensated for by slightly moving the second to fifth groups from the wide angle end to a place where an angle of view is narrow.

These may be combined to thereby realize a macro-photographing mechanism having high performance.

Moreover, movement of the second and fourth groups may be slightly changed from the zoom range to thereby further reduce the minor variation in aberration as previously mentioned in connection with the above (1).

DETAILED DESCRIPTION OF THE PREFERRED EMBODIMENT

Figure 1:
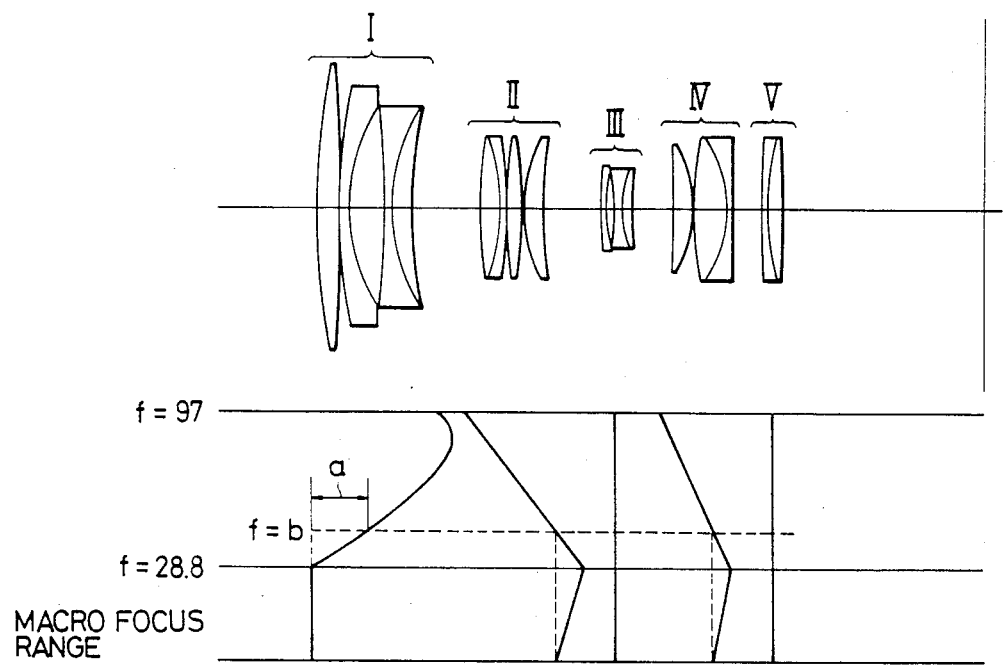
FIG. 1 is a sectional view and a moving locus view of one embodiment of a zoom lens in accordance with the present invention.
Figure 2A:
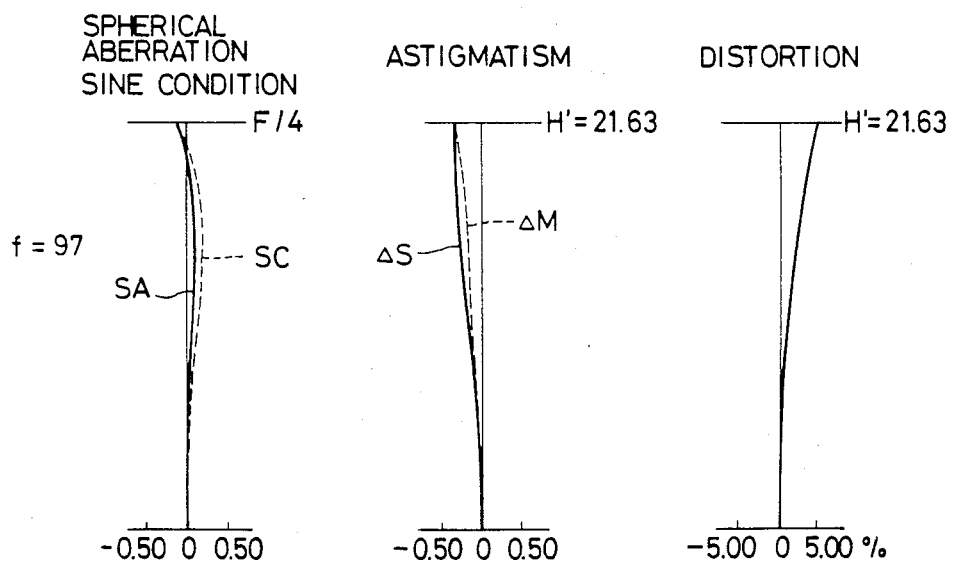
FIG. 2 shows aberration curves.
Figure 3A:
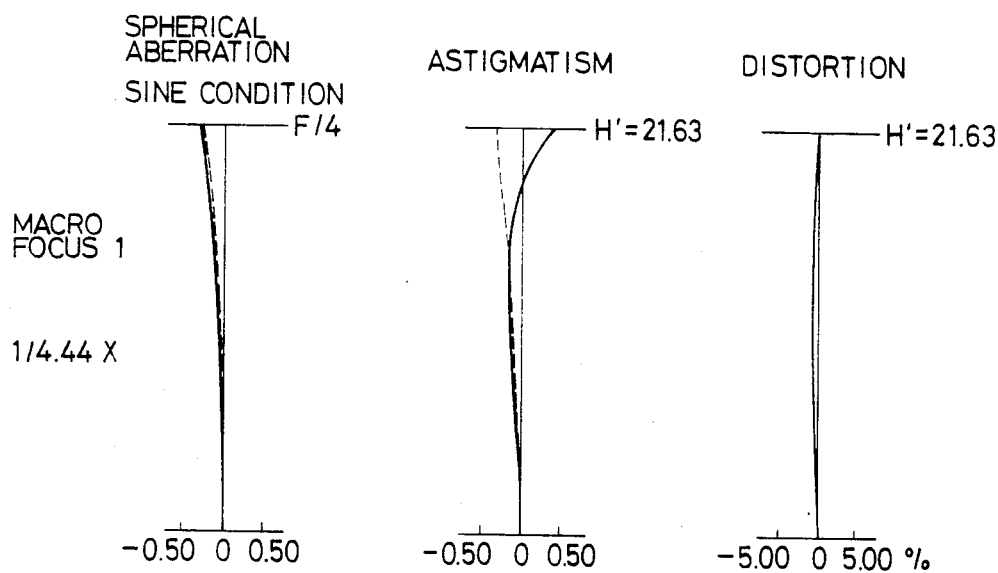
FIG. 3 shows aberrations in case of macro-photographing.
Figure 3B:
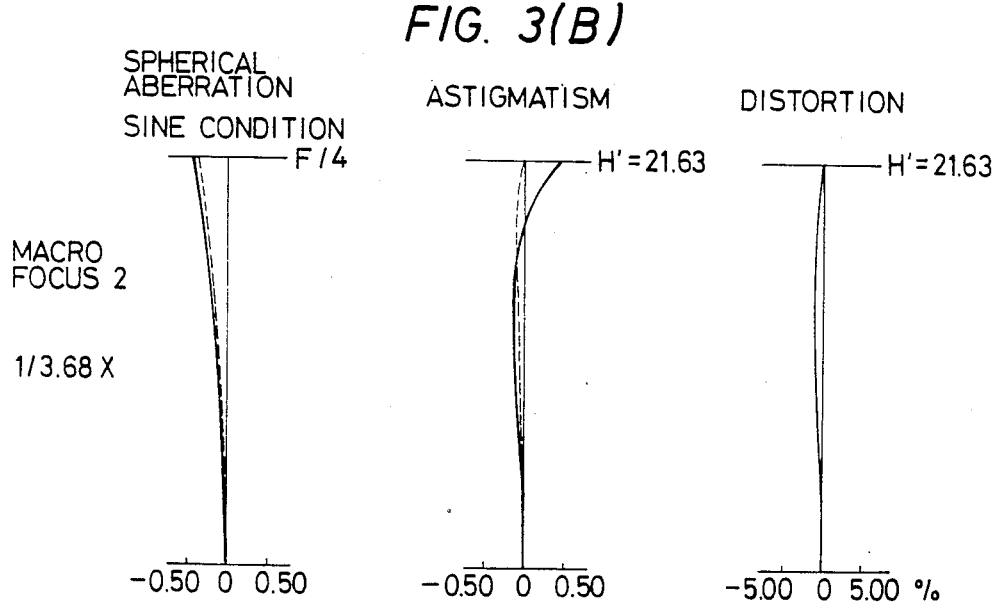

A specific embodiment will be shown below. In the following table, symbols used are as follows:

$r_i$: radius of curvature of the $i^{th}$ surface $d_i$: spacing on optical axis between the $i^{th}$ surface and the $i^{th}+1$ surface $n_i$: refractive index of line d of the $i^{th}$ lens $\nu_i$: the number of Abbe of the $i^{th}$ lens variable spacings in the table being such that in macro 1, only the second and fourth groups are moved from the wide angle end for purpose of macro-focusing, resonance length 280.6 magnification 1/4.44, and in macro 2, the delivery of the first group used for focusing in the zoom range from the state of macro 1 is added thereto, resonance length 251.8 magnification 1/3.68

| f | 97.0 | 52.85 | 28.8 | macro 1 | macro 2 |
|---|---|---|---|---|---|
| $d_7$ | 0.913 | 13.969 | 38.047 | 32.847 | 35.096 |
| $d_{14}$ | 27.011 | 12.623 | 3.276 | 7.676 | 7.676 |
| $d_{19}$ | 1.779 | 8.514 | 13.647 | 11.047 | 11.047 |
| $d_{24}$ | 12.699 | 5.963 | 0.831 | 3.431 | 3.431 |

| Embodiment | f = 97.0 − 28.8 | | FNo = 4 | |
|---|---|---|---|---|
| $r_1 = 167.347$ | | | | |
| | $d_1 = 4.5$ | | $n_1 = 1.65844$ | $\nu_1 = 50.85$ |
| $r_2 = -519.920$ | | | | |
| | $d_2 = .1$ | | | |
| $r_3 = 131.827$ | | | | |
| | $d_3 = 2.0$ | | $n_2 = 1.71300$ | $\nu_2 = 53.94$ |
| $r_4 = 38.000$ | | | | |
| | $d_4 = 7.33$ | | | |
| $r_5 = -153.440$ | | | | |
| | $d_5 = 1.5$ | | $n_3 = 1.75500$ | $\nu_3 = 52.33$ |

-continued

| | | | |
|---|---|---|---|
| $r_6 = 37.832$ | | | |
| | $d_6 = 3.9$ | $n_4 = 1.84666$ | $\nu_4 = 23.83$ |
| $r_7 = 75.998$ | | | |
| | $d_7 = $ variable | | |
| $r_8 = 87.981$ | | | |
| | $d_8 = 4.88$ | $n_5 = 1.69680$ | $\nu_5 = 55.46$ |
| $r_9 = -34.190$ | | | |
| | $d_9 = 1.1$ | $n_6 = 1.84666$ | $\nu_6 = 23.83$ |
| $r_{10} = -112.137$ | | | |
| | $d_{10} = .1$ | | |
| $r_{11} = 165.710$ | | | |
| | $d_{11} = 3.04$ | $n_7 = 1.51680$ | $\nu_7 = 64.20$ |
| $r_{12} = -67.114$ | | | |
| | $d_{12} = .1$ | | |
| $r_{13} = 27.957$ | | | |
| | $d_{13} = 4.0$ | $n_8 = 1.51680$ | $\nu_8 = 64.20$ |
| $r_{14} = 76.952$ | | | |
| | $d_{14} = $ variable | | |
| $r_{15} = 67.435$ | | | |
| | $d_{15} = 1.0$ | $n_9 = 1.51680$ | $\nu_9 = 64.20$ |
| $r_{16} = 36.999$ | | | |
| | $d_{16} = 1.9$ | | |
| $r_{17} = -32.339$ | | | |
| | $d_{17} = 1.0$ | $n_{10} = 1.69680$ | $\nu_{10} = 55.46$ |
| $r_{18} = 17.706$ | | | |
| | $d_{18} = 2.2$ | $n_{11} = 1.80518$ | $\nu_{11} = 25.46$ |
| $r_{19} = 46.091$ | | | |
| | $d_{19} = $ variable | | |
| $r_{20} = -639.110$ | | | |
| | $d_{20} = 3.92$ | $n_{12} = 1.74400$ | $\nu_{12} = 44.87$ |
| $r_{21} = -28.382$ | | | |
| | $d_{21} = .1$ | | |
| $r_{22} = 68.486$ | | | |
| | $d_{22} = 7.5$ | $n_{13} = 1.58913$ | $\nu_{13} = 61.25$ |
| $r_{23} = -21.141$ | | | |
| | $d_{23} = 1.1$ | $n_{14} = 1.80518$ | $\nu_{14} = 25.46$ |
| $r_{24} = -5298.500$ | | | |
| | $d_{24} = $ variable | | |
| $r_{25} = 237.362$ | | | |
| | $d_{25} = 1.2$ | $n_{15} = 1.71300$ | $\nu_{15} = 53.94$ |
| $r_{26} = 54.862$ | | | |
| | $d_{26} = 3.4$ | $n_{16} = 1.68893$ | $\nu_{16} = 31.16$ |
| $r_{27} = -352.816$ | | | |

The present invention is constructed as described above and exhibits excellent effects as follows:

(1) Since the arrangement of lenses is not forcibly changed for macro-focusing, a break of aberrations is extremely small, (2) since the second group and fourth group are moved from the wide angle end to the narrow angle side, the range of lens movement is not increased for the purpose of macro-focusing and compactness of lens is not impaired, (3) since macro-focusing is performed by the lens groups which move for the purpose of zooming, construction of mount is simple, and (4) movement of the second and fourth groups is slightly changed when zooming is effected, whereby variation in aberration can be further reduced.

What is claimed is:

1. A macro focusing zoom lens comprising:
   a first lens group positioned near the object side and having a negative refractive power;
   a second lens group positioned after said first lens group and having a positive refractive power;
   a third lens group positioned after said second lens group and having a negative refractive power;
   a fourth lens group positioned after said third lens group and having a positive refractive power;
   a fifth lens group positioned after said fourth lens group and having a positive refractive power;
   zooming means coupled to said lens groups for zooming from a telephoto side to a wide angle wherein said second and fourth lens groups are moved as a variator towards an image, and where said first lens group is moved as a compensator with said third and fifth lens groups being fixed and wherein a macro-zoom focusing is performed by said focusing means by movement of said second and fourth lens groups from the wide angle side of said lens towards the object side.

2. A macro-focusing zoom lens as claimed in claim 1 as represented by the following table, in which table,
   $r_i$: radius of curvature of the $i^{th}$ surface
   $d_i$: spacing on optical axis between the $i^{th}$ surface and the $i^{th}+1$ surface
   $n_i$: refractive index of line d of the $i^{th}$ lens
   $\nu_i$: the number of Abbe of the $i^{th}$ lens variable spacings in the table being such that in macro 1, only the second and fourth groups are moved from the wide angle end for purpose of macro-focusing, resonance length 280.6 magnification 1/4.44, and in macro 2, the delivery of the first group used for focusing in the zoom range from the state of macro 1 is added thereto, resonance length 251.8 magnification 1/3.68,

| f | 97.0 | 52.85 | 28.8 | macro 1 | macro 2 |
|---|---|---|---|---|---|
| $d_7$ | 0.913 | 13.969 | 38.047 | 32.847 | 35.096 |
| $d_{14}$ | 27.011 | 12.623 | 3.276 | 7.676 | 7.676 |
| $d_{19}$ | 1.779 | 8.514 | 13.647 | 11.047 | 11.047 |
| $d_{24}$ | 12.699 | 5.963 | 0.831 | 3.431 | 3.431 |

| $f = 97.0\ 28.8$ | | | $FNo = 4$ |
|---|---|---|---|
| $r_1 = 167.347$ | | | |
| | $d_1 = 4.5$ | $n_1 = 1.65844$ | $\nu_1 = 50.85$ |
| $r_2 = -519.920$ | | | |
| | $d_2 = .1$ | | |
| $r_3 = 131.827$ | | | |
| | $d_3 = 2.0$ | $n_2 = 1.71300$ | $\nu_2 = 53.94$ |
| $r_4 = 38.000$ | | | |
| | $d_4 = 7.33$ | | |
| $r_5 = -153.440$ | | | |
| | $d_5 = 1.5$ | $n_3 = 1.75500$ | $\nu_3 = 52.33$ |
| $r_6 = 37.832$ | | | |
| | $d_6 = 3.9$ | $n_4 = 1.84666$ | $\nu_4 = 23.83$ |
| $r_7 = 75.998$ | | | |
| | $d_7 = $ variable | | |
| $r_8 = 87.981$ | | | |
| | $d_8 = 4.88$ | $n_5 = 1.69680$ | $\nu_5 = 55.46$ |
| $r_9 = -34.190$ | | | |
| | $d_9 = 1.1$ | $n_6 = 1.84666$ | $\nu_6 = 23.83$ |
| $r_{10} = -112.137$ | | | |
| | $d_{10} = .1$ | | |
| $r_{11} = 165.710$ | | | |
| | $d_{11} = 3.04$ | $n_7 = 1.51680$ | $\nu_7 = 64.20$ |
| $r_{12} = -67.114$ | | | |
| | $d_{12} = .1$ | | |
| $r_{13} = 27.957$ | | | |
| | $d_{13} = 4.0$ | $n_8 = 1.51680$ | $\nu_8 = 64.20$ |
| $r_{14} = 76.952$ | | | |
| | $d_{14} = $ variable | | |
| $r_{15} = 67.435$ | | | |
| | $d_{15} = 1.0$ | $n_9 = 1.51680$ | $\nu_9 = 64.20$ |
| $r_{16} = 36.999$ | | | |
| | $d_{16} = 1.9$ | | |
| $r_{17} = -32.339$ | | | |
| | $d_{17} = 1.0$ | $n_{10} = 1.69680$ | $\nu_{10} = 55.46$ |
| $r_{18} = 17.706$ | | | |
| | $d_{18} = 2.2$ | $n_{11} = 1.80518$ | $\nu_{11} = 25.46$ |
| $r_{19} = 46.091$ | | | |
| | $d_{19} = $ variable | | |
| $r_{20} = -639.110$ | | | |
| | $d_{20} = 3.92$ | $n_{12} = 1.74400$ | $\nu_{12} = 44.87$ |
| $r_{21} = -28.382$ | | | |
| | $d_{21} = .1$ | | |
| $r_{22} = 68.486$ | | | |
| | $d_{22} = 7.5$ | $n_{13} = 1.58913$ | $\nu_{13} = 61.25$ |
| $r_{23} = -21.141$ | | | |
| | $d_{23} = 1.1$ | $n_{14} = 1.80518$ | $\nu_{14} = 25.46$ |
| $r_{24} = -5298.500$ | | | |
| | $d_{24} = $ variable | | |
| $r_{25} = 237.362$ | | | |
| | $d_{25} = 1.2$ | $n_{15} = 1.71300$ | $\nu_{15} = 53.94$ |
| $r_{26} = 54.862$ | | | |
| | $d_{26} = 3.4$ | $n_{16} = 1.68893$ | $\nu_{16} = 31.16$ |
| $r_{27} = -352.816$ | | | |

* * * * *